United States Patent [19]

Sanok et al.

[11] Patent Number: 4,761,916
[45] Date of Patent: Aug. 9, 1988

[54] MOLDED URETHANE WINDOW GASKET ASSEMBLY WITH HINGE MEMBER AND APPARATUS AND METHOD FOR MAKING SAME

[75] Inventors: John L. Sanok, Grosse Ile, Mich.; David G. Adams, Toledo, Ohio

[73] Assignee: Sheller Globe Corporation, Toledo, Ohio

[21] Appl. No.: 5,334

[22] Filed: Jan. 15, 1987

Related U.S. Application Data

[63] Continuation of Ser. No. 560,603, Dec. 12, 1983, abandoned, which is a continuation-in-part of Ser. No. 505,196, Jun. 17, 1983, Pat. No. 4,648,832.

[51] Int. Cl.⁴ .............................................. E05D 15/00
[52] U.S. Cl. ................................... 49/381; 160/231.2
[58] Field of Search ............... 49/381, 501; 296/84 R; 160/231 A

[56] References Cited

U.S. PATENT DOCUMENTS

| | | |
|---|---|---|
| 1,911,578 | 5/1933 | Masters . |
| 2,025,198 | 12/1935 | Conrow . |
| 2,258,724 | 10/1941 | Wagner et al. . |
| 2,266,235 | 12/1941 | Mollard . |
| 2,342,758 | 2/1944 | Saunders et al. . |
| 2,576,392 | 11/1951 | Downes . |
| 2,645,827 | 7/1953 | Koll . |
| 2,701,041 | 2/1955 | Toth . |
| 2,966,435 | 12/1960 | Kassinger . |
| 2,974,407 | 3/1961 | Barr . |
| 3,430,333 | 3/1969 | Hogden . |
| 3,440,121 | 4/1969 | Shockey . |
| 3,659,896 | 5/1972 | Smith et al. . |
| 3,671,370 | 6/1972 | Littell, Jr. . |
| 3,719,222 | 3/1973 | Harding et al. . |
| 3,744,201 | 7/1973 | Dochnahl . |
| 3,776,591 | 12/1973 | Krueger . |
| 3,843,982 | 10/197⁻ | Lane . |
| 3,851,432 | 12/1974 | Griffin . |

(List continued on next page.)

FOREIGN PATENT DOCUMENTS 0076924 7/1984 European Pat. Off. .
1509278 7/1970 Fed. Rep. of Germany .

(List continued on next page.)

OTHER PUBLICATIONS

Wirtz, H., "Progress in Rim Technology for Automobile Components", in Plastic and Rubber Processing, Dec. 1979, pp. 167-170.

Plastics Engineering, "The Story Behind Liquid Injection Molding of Polyurethanes", by French Conway, Assoc. Editor—1/1975, pp. 25-29.

(List continued on next page.)

Primary Examiner—Philip C. Kannan
Attorney, Agent, or Firm—Harness, Dickey & Pierce

[57] ABSTRACT

An improved window gasket assembly with an integral living hinge member and the apparatus and associated method for reaction injection molding and bonding such assemblies, as well as other molded articles, are disclosed. The gasket is preferably integrally molded from an elastomeric material such as urethane, and at least a portion of which is simultaneously bonded onto at least one substantially transparent window panel. The gasket and window assembly can then be mounted and bonded or secured directly to a vehicle body panel opening, for example, with adhesives, thereby eliminating the need for discrete mechanical fasteners, with at least one window panel being hingedly and pivotally attached to said vehicle body panel. In one preferred embodiment of the invention, an improved aftermixer and gating apparatus includes a mixing body in which a flowable multi-constituent molding material is separated into a number of generally serpentine mixing passageways and reunited in a common mixing cavity before being conveyed through a fan-gate passageway to the mold cavity. Adjustment means is provided for selectively altering the size of the mixing cavity and its inlet openings in order to selectively alter the back-pressure exerted on the material flowing therethrough, thereby enhancing the mixing of the molding material constituents. An improved mold apparatus is also preferably employed and includes elongated elastomeric members along the preferable edge of the mold cavity for supportingly engaging the mold members and substantially minimizing or preventing flashing of the molding material therefrom.

11 Claims, 3 Drawing Sheets

U.S. PATENT DOCUMENTS

| | | |
|---|---|---|
| 3,884,007 | 5/1975 | Thoman . |
| 3,913,892 | 10/1975 | Ersfeld et al. . |
| 3,917,792 | 11/1975 | Conacher, Jr. . |
| 3,941,355 | 3/1976 | Simpson . |
| 3,952,991 | 4/1976 | Schneider . |
| 3,968,612 | 7/1976 | Endo et al. . |
| 3,984,510 | 10/1976 | Chandra et al. . |
| 4,007,536 | 2/1977 | Soderberg . |
| 4,072,340 | 2/1978 | Morgan . |
| 4,072,673 | 2/1978 | Lammers . |
| 4,135,180 | 1/1979 | White . |
| 4,139,234 | 2/1979 | Morgan . |
| 4,190,711 | 2/1980 | Zdrahala et al. . |
| 4,284,673 | 8/1981 | Ockels . |
| 4,363,191 | 12/1982 | Morgan ................................ 49/381 |
| 4,364,214 | 12/1982 | Morgan . |
| 4,409,758 | 10/1983 | Dickerson et al. ............. 160/231 A |
| 4,470,785 | 9/1984 | Koorevaar . |
| 4,584,155 | 4/1986 | Zanella . |

FOREIGN PATENT DOCUMENTS

| | | |
|---|---|---|
| 2062981 | 7/1971 | Fed. Rep. of Germany . |
| 2117523 | 10/1972 | Fed. Rep. of Germany . |
| 2544749 | 4/1977 | Fed. Rep. of Germany . |
| 2855050 | 7/1979 | Fed. Rep. of Germany . |
| 1374552 | 8/1964 | France . |
| 2157189 | 6/1973 | France . |
| 2204497 | 5/1974 | France . |
| 2266582 | 10/1975 | France . |
| 2393663 | 2/1978 | France . |
| WO85/01468 | 4/1985 | PCT Int'l Appl. . |
| 695257 | 8/1953 | United Kingdom . |
| 961021 | 6/1964 | United Kingdom . |
| 1065958 | 4/1967 | United Kingdom . |
| 1327390 | 8/1973 | United Kingdom . |
| 1478714 | 7/1977 | United Kingdom . |
| 1523547 | 9/1978 | United Kingdom . |
| 2049542A | 12/1980 | United Kingdom . |
| 2057338A | 4/1981 | United Kingdom . |
| 2079667A | 1/1982 | United Kingdom . |
| 2115739A | 9/1983 | United Kingdom . |
| 2141375A | 12/1984 | United Kingdom . |
| 2147244A | 5/1985 | United Kingdom . |

OTHER PUBLICATIONS

Emmerich, Anthony, "Liquid Injection Molding: Where It Stands Today", in Plastics Technology, Apr. 1980, pp. 91–96.

Becker, Walter E., "Reaction Injection Molding", New York, Van Nostrand Reinhold Co., c1979—pp. 59–60, 78–86, 215–235.

"Glass Bonding with Polyurethane"—ATZ Automobiltechnische Zeitschrift 85 (1983)—p. 678.

The "LIVING" Hinge—Monmouth Plastics, Inc., New Jersey (2 pages).

Bayer Polyurethanes, Bayer Chemical Co., W. Germany, circa. 1979 (Ed. #1.79E35-7109/847991), pp. 130–139.

"RIM Emerges as a Major Process"—Modern Plastics, Aug. 1979.

Urethane Chemicals Bulletin—Thanol SF-6503 POLYOL—Texaco Chemical Company.

Material Safety Data Sheet—DABCO 33-LV—Air Products & Chemicals, Inc., 1980.

Technical Bulletin—PRC 789, "Mold Release Agent for Rim/Microcellular Urethanes—Low Mold Temperatures", Park Chemical Company.

Formula Selection—"FREKOTE: The Unconditional Release"—Frekote, Inc.

Chemical Coatings—Polane T. Green (Modified), SA8060-G64—Sherwin Williams Company—May 1981.

Release Agents from CONTOUR.

Technical Information—Isonate 143L, Isonate 181, Isonate 191 and Isonate 240—The Upjohn Company.

Mondur PF—Modified Polyisocyanate Product Code: C-261—Mobay Chemical Corporation.

Mondur CD—Polyisocyanate Product Code: C-90-5—Mobay Chemical Corporation.

Bulletin 395—WITCO FOMREZ UL-28, "High Performance Organotin Catalyst", Witco Chemical Organics Division—Jan. 1980.

MOLDED URETHANE WINDOW GASKET ASSEMBLY WITH HINGE MEMBER AND APPARATUS AND METHOD FOR MAKING SAME

This is a continuation of application Ser. No. 560,603 filed Dec. 12, 1983, now abandoned which is a continuation-in-part of Ser. No. 505,196, filed June 17, 1983 now U.S. Pat. No. 4,648,832.

BACKGROUND AND SUMMARY OF THE INVENTION

The invention relates generally to molded window gaskets and to the reaction injection molding of such articles from a multi-constituent material in a mold cavity. More particularly, the invention relates to such gaskets for automotive applications and to equipment and methods of reaction injection molding of such articles, wherein the elastomeric urethane window gaskets are integrally molded and securely bonded onto a window panel of glass or other transparent material and include living hinge members incorporated therein. Reference is made to the related copending applications "Molded Window Gasket Assembly And Apparatus And Method For Making Same", Ser. No. 505,196, filed on June 17, 1983, and "Molded Window Gasket Assembly And Apparatus And Method For Making And Bonding Same", filed of even date herewith, both of which are assigned to the same assignee as the present invention. The disclosures of said related copending applications are hereby incorporated herein by reference.

It has been known in the past to fabricate articles such as modular vehicular window gaskets, having hinge members or portions therein, from materials such as polyvinylchloride (PVC) using conventional compression or injection molding techniques. Some of such window gaskets have been injection molded directly onto the window panel, which is made of glass or other substantially transparent material. The window and gasket assemblies have then been installed in a vehicle or other window frame with adhesives and/or with integrally molded fastener protrusions, as disclosed, for example, in U.S. Pat. No. 4,072,340, and with hinge members therein disclosed in U.S. Pat. No. 4,139,234. It has been found, however, that window panel breakage has been unacceptably high in such prior processes because of the high pressures required in the injection molding processes and because of the hardness and rigidity of the mold structures involved. Additionally, because of the types of materials previously used in molding the gaskets, such as rubber of polyvinylchloride (PVC), it has been found that proper adhesion of such gaskets to metal body panels and to glass window panels has been difficult to attain, thereby resulting in water leaks, wind noise, and other related problems, as well as requiring the use of mechanical fasteners to secure the assemblies to the body panels.

In accordance with the present invention, improved apparatuses and methods of reaction injection molding articles such as vehicular window gasket assemblies are provided in order to overcome the above-discussed disadvantages. Such methods and apparatus allow window gasket assemblies to be reaction injection molded from multi-constituent materials, such as urethane, for example, and to be molded at relatively low pressures and securely bonded directly onto the glass or other transparent window panels.

According to the present invention, such gasket assemblies include at least one movable member and a flexible living hinge web integrally molded therewith in a one-piece structure. The window panel assembly can then be movably mounted in a window opening in a body panel and secured thereto. In one embodiment, the gasket assembly also includes at least one integrally molded fixed gasket member with the hinge web interconnectably extending therebetween. The fixed gasket member is adapted to be bonded and secured directly to the vehicle body with adhesives without the need for mechanical fastener devices, thereby simplifying the installation process and making it better suited for robotic or other automated equipment. Because of the incorporation of the flexible living hinge web integrally molded into the gasket assembly such ease of installation is also attainable in window arrangements such as rear quarter windows and folding convertible top windows, for example, wherein at least one window panel must be pivotaly movable relative to the vehicle body. All or a portion of the preferably urethane gasket can also be coated with a pigmented decorative material in the mold cavity if desired.

The gasket assembly according to the present invention may also be fabricated with a lower cross-sectional profile, thereby providing for an advantageous, aerodynamically smooth fit between the window assembly and the body panel. Such lower profile also requires less offset or other forming of the body panel area surrounding the window opening, thus simplifying the body panel fabrication and increasing the design flexibility for such body panels. Also because in at least some embodiments of the invention the gasket and window assembly is preferably bonded and secured to the body panel substantially continuously around the window opening periphery, the localized stress concentrations caused by spaced, discrete mechanical fasteners are substantially avoided and the bonding and securing forces are more evenly distributed. Such modular window structure, with its strong and preferably continuous, peripheral bond allows the window panel to effectively contribute to the structural integrity of the installation, and also to allow for a reduction in window panel thickness and weight.

The strong and secure bond between the preferably urethane gasket member and the preferably glass window panel is achieved by a novel method whereby the bonding occurs simultaneously with the molding process. Generally speaking the preferred bonding method includes the steps of applying a primer material, by spraying or wiping, to at least the peripheral portions of the window panel, allowing the primer to air dry for a relatively short period of time, and inserting at least the peripheral portions into the mold cavity. A flowable urethane, or urethane-containing, multi-constituent material is then injected or otherwise introduced into the mold cavity where the gasket member is allowed to at least partially cure.

In a preferred embodiment of the present invention, an aftermixer apparatus for use in a reaction injection molding system includes a mixing body having at least one common inlet passageway for receiving a multi-constituent material (preferably urethane) in a pressurized flowable state. The apparatus includes a number of mixing passageways adapted to receive the material from the common inlet passageway and separate it into a corresponding number of material flow streams. A common mixing cavity in fluid communication with the mixing passageways reunites the separated flow streams and conveys the material into a gating device for introduction flow the mold cavity. Adjustment means is provided for selectively altering the size of the common mixing cavity and the size of its inlets in order to selectively alter the back-pressure exerted on the material flowing therethrough. Such adjustment feature allows for the optimization of the back-pressure and thus the intermixing of the constituents of the material for a given flow rate and inlet pressure thereof. Preferably, the mixing passageways each extend along a generally serpentine path including at least one bight portion adapted to cause the material flowing therethrough to substantially reverse its direction of flow in order to increase turbulence and enhance the mixing of the material constituents.

At least a portion of the preferred mold cavity of the reaction injection molding system includes one or more elongated elastomeric members positioned generally adjacent the peripheral edge of the mold cavity for supportingly engaging the mold members and the window panel. The flexible elongated elastomeric members are preferably seated in grooves in one or the other of the mold members and are further adapted to substantially minimize or prevent flashing of the gasket material out of the mold cavity and also serve to accommodate variations in the shape of the window panels.

Additionally objects, advantages and features of the present invention will become apparent from the following description and appended claims, taken in conjunction with the accompanying drawings.

DETAILED DESCRIPTION OF THE PREFERRED EMBODIMENTS

In FIGS. 1 through 10, exemplary embodiments of the present invention are illustrated for the injection molding and bonding of integrally-molded vehicular window panel gasket assemblies, having flexible living hinges integrally molded therein, onto their associated glass or other substantially transparent window panels. One skilled in the art will readily recognize from the following discussion, however, that the principles of the invention are equally applicable to reaction injection molding and bonding of items other than vehicular window gaskets, as well as being applicable to apparatus other than the reaction injection molding system shown in the drawings.

Figure 1:
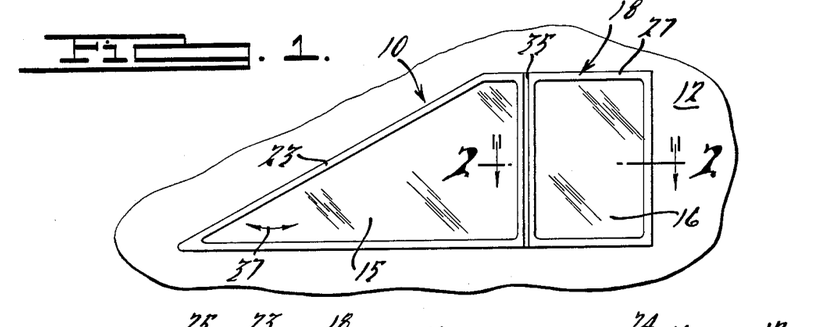
FIG. 1 is an elevational view of one preferred gasket and window panel assembly installed in a vehicle body panel and having a movable window panel hingedly and pivotally movable relative to a fixed window panel according to the present invention.
Figure 2:
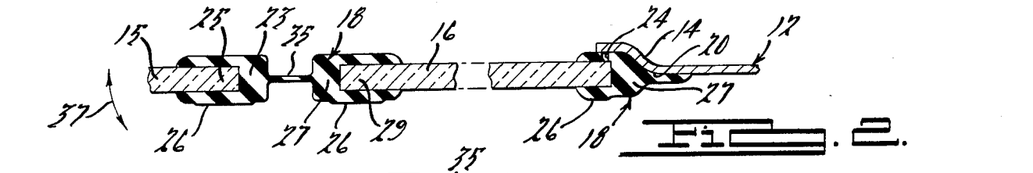
FIG. 2 is a cross-sectional view taken along line 2—2 of FIG. 1.

In FIGS. 1 and 2 an exemplary modular vehicular window assembly 10 generally includes at least one substantially transparent movable window panel 15, at least one substantially transparent fixed window panel 16, and a window gasket assembly 18. As illustrated in the drawings, the window panels 15 and 16 and the gasket assembly 18 are adapted to be sealingly disposed in a window opening in a vehicle body panel 12 or the like, with at least a fixed portion of the gasket assembly 18 bonded and secured directly to a recessed portion 14 of the peripheral area of the vehicle body surrounding the window opening with an adhesive material 20. Thus, the need is elimated for mechanical fasteners protruding through apertures in the body or embedded in the gasket material. By eliminating the need for such fasteners, the cross-sectional profile of the gasket assembly 18 may be minimized in order to provide a smooth relatively unobtrusive fit with the vehicle body panel 12, thereby reducing the aerodynamic drag on the vehicle. Also, because the gasket and window panel assembly is secured and bonded substantially continuously around at least a substantial portion of the periphery of the fixed window panel 16, the window panel 16 effectively becomes part of the body structure and is not subjected to the localized stress concentrations caused by discrete mechanical fasteners. Thus at least the window panel 16 can be thinner and lighter in weight than those previously used. If direct bonding between the body panel 12 and the window panel 16 is also desired, the window gasket assembly 18 may optionally be formed with a channel-shaped opening 24 extending therethrough in order to allow a suitable adhesive to bond the window panel 16 directly to the recessed portion 14. Such optional channel-shaped opening 24 may consist of either a single opening extending continuously throughout the entire window gasket assembly 18, or a series of discrete channel-shaped openings at spaced locations throughout the window gasket assembly.

As will become apparent from the discussion below, the window gasket assembly 18, which is preferably composed or urethane or a urethane-containing material, may also optionally include a coating of pigmented material either on its entire exterior surface, or on a predetermined portion thereof, as illustrated by reference numeral 26. Such coating of pigmented material can be applied to the window gasket assembly 18 during the molding process in order to provide a decorative stripe on its exterior surface or to color the window gasket member in order to complement the color scheme of the vehicle.

As shown in the drawings, the exemplary gasket assembly 18 illustrated in FIGS. 1 and 2 includes a movable gasket member 23 secured and bonded to at least a portion of the peripheral edge area 25 of the movable window panel 15 and a fixed gasket member 27 secured and bonded to at least a portion of the peripheral edge area 29 of the fixed window panel 16. A flexible living hinge web 35 interconnectably extends between the movable and fixed gasket members 23 and 27, respectively, and is integrally molded in a one-piece structure therewith. The hinge web 35 functions to hingedly and pivotally attach the movable gasket member 23 and the movable window panel 15 to the body panel 12 for opening and closing pivotal movement as indicated by arrow 37.

It should be noted that although both the movable and fixed gasket members 23 and 27 are shown in the various figures herein as being integrally molded and bonded substantially continuously around substantially the entire peripheral edge areas of their respective window panels 15 and 16, at least the movable window panel 15 may alternatively have its gasket member 23 integrally molded and bonded only along the portion of the edge area 25 that is generally adjacent the living hinge web 35. In such an alternate embodiment, the remainder of the edge area 25 would be bare and would sealingly abut or engage a sealing member on the peripheral area of the body panel 12 surrounding the window opening when in its closed position.

Figures 3, 4, 5, 6:
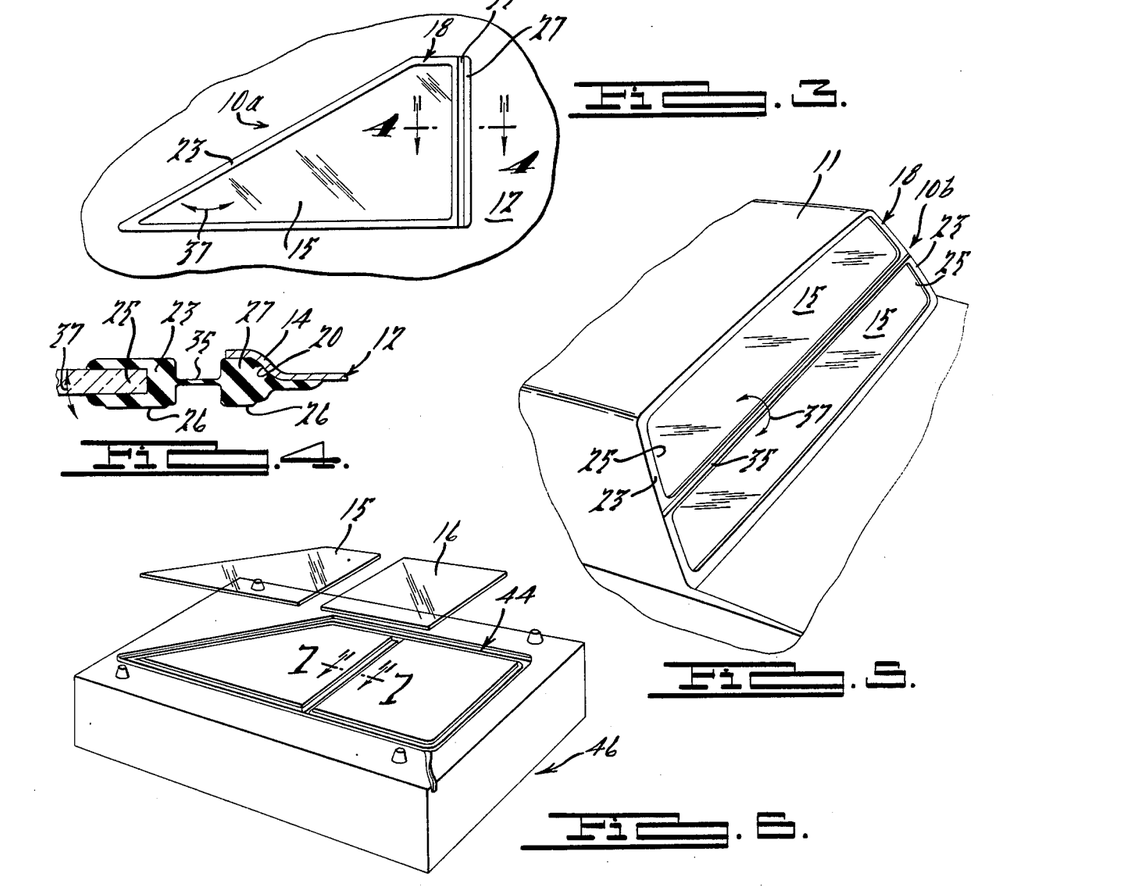
FIG. 3 is an elevational view of an alternate gasket and window panel assembly similar to that of FIG. 1, but having only a movable window panel.
FIG. 4 is a cross-sectional view taken along line 4—4 of FIG. 3.
FIG. 5 is a partial perspective view of the rear window of a convertible top, illustrating still another alternate embodiment of the present invention.
FIG. 6 is a schematic perspective view of a portion of a mold apparatus for molding the window gasket assembly of FIG. 1.

FIGS. 3 and 4 illustrate an exemplary alternate modular vehicular window assembly 10a according to the present invention. Window assembly 10a is similar to window 10b of FIGS. 1 and 2, but has only a single window panel hingedly and pivotally disposed in the vehicle body panel 12. The same reference numerals are used for the corresponding elements in the various embodiments shown in the drawings for purposes of illustrating some examples of the many applications of the present invention.

Like the window assembly 10 of FIGS. 1 and 2, the window assembly 10a of FIGS. 3 and 4 generally includes a substantially transparent movable window panel 15 and a window gasket assembly 18. The gasket assembly 18 includes a movable gasket member 23 bonded and secured to at least a portion of the peripheral edge area 25 of the movable window panel 15 and a fixed gasket member 27 secured and bonded directly to the recessed portion 14 of the peripheral area of the body panel 12 surrounding the window opening with an adhesive material 20. Thus, the need is eliminated for mechanical fasteners protruding through apertures in the body or embedded in the gasket material.

A flexible living hinge web 35 interconnectably extends between the movable and fixed gasket members 23 and 27, respectively, in FIGS. 3 and 4 and is integrally molded in a one-piece structure therewith. The hinge web 35 functions to hingedly and pivotally attach the movable gasket member 23 and the movable window panel 15 to the body panel 12 for opening and closing pivotal movement as indicated by arrow 37.

Still another example of the many varied applications of the present invention is the modular window assembly 10b illustrated in FIG. 5. Window assembly 10b is a foldable rear window assembly for either a soft or hard convertible top 11 and generally includes at least a pair of movable window panels 15 and a gasket assembly 18. Each of the window panels 15 has a movable gasket member 23 secured and bonded to at least a portion of their respective peripheral edge areas 25. The movable gasket members 23 are interconnected along generally adjacent sides by a flexible living hinge web 35, which is integrally molded in a one-piece structure therewith. The hinge web 35 functions to allow the movable gasket members 23 and the movable window panels 15 to hingedly and pivotally move relative to one another, as indicated by the arrow 37, as the convertible top 11 is raised or lowered. The sides of the gasket assembly 18 generally adjacent the top 11 are preferably bonded and secured directly to the top 11 itself, or directly to a suitable frame or reinforcing member thereon, with an adhesive material without the need for mechanical fasteners as discussed above in connection with other embodiments of the invention. It may be desirable in this or other applications to mold and bond gasket members, interconnected by an integral living hinge web, only to adjacent edges of adjacent window panels without including such gasket members on the remaining peripheral edges of the window panels. The window gasket member 18 is preferably molded from a multi-constituent material, such as the preferred liquid multi-constituent material for example, in a suitable reaction injection molding apparatus such as the mold apparatus 46 schematically illustrated in FIGS. 6 and 7, for example. Such urethane material may be composed, for example, of a polyol resin constituent, an isocyanate constituent, and a catalyst. Examples of commercially-available polyol resins are manufactured by The Dow Chemical Company under the trademark VORANOL and by Texaco Chemical Company under the trademark THANOL SF-6503. Examples of commercial isocyanates are produced by The Upjohn Company under the trademark ISONATE 143L, ISONATE 181, ISONATE 191 and ISONATE 240, and also by Mobay Chemical Corporation under the trademarks MONDUR PF and MONDUR CD. An example of a suitable catalyst for such urethane material is marketed by Witco Chemical Company under the trademark WITCO FOMREZ UL-28.

Figure 8:
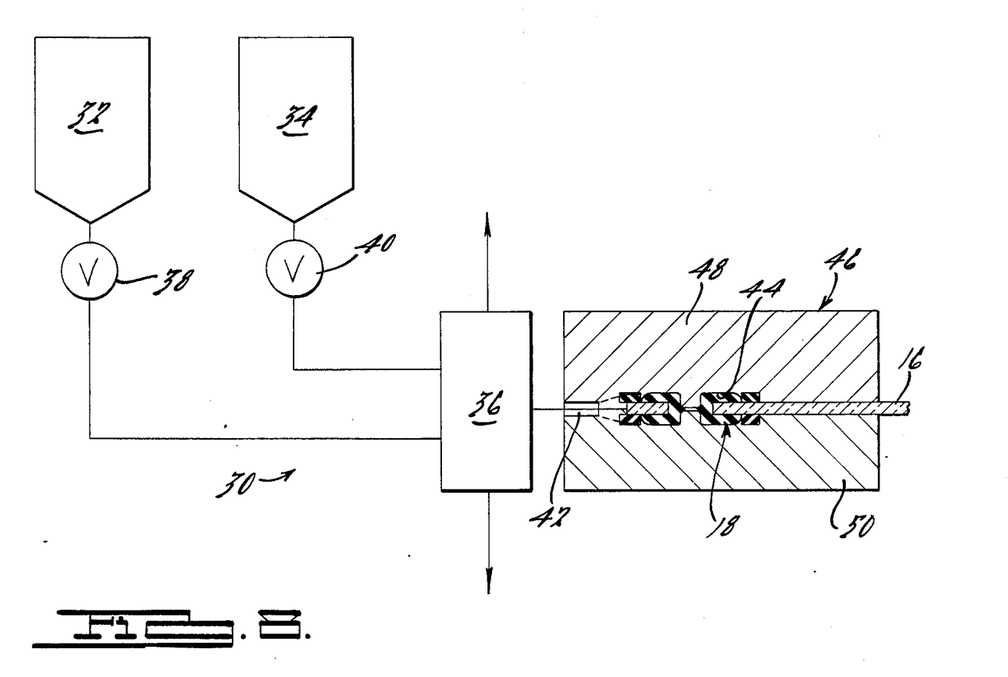
FIG. 8 is a schematic diagram illustrating a reaction injection molding system for fabricating and bonding together the gasket and window panel assembly of FIG. 1.

As illustrated schematically by the reaction injection molding system 30 in FIG. 8, the constituents of the window gasket material are injected from two or more constituent sources 32 and 34 into a high-pressure mixing apparatus 36 by way of the respective metering devices 38 and 40. The constituents of the material are mixed in the high-pressure mixing apparatus 36 at pressures in the range of approximately 2000 p.s.i.g. to approximately 300 p.s.i.g. and are conveyed to an aftermixer and gating appartus 42. As discussed below, the aftermixer and gating apparatus 42 further mixes the constituents of the gasket material and reduces its pressure to a range of approximately 30 p.s.i.g. to approximately 100 p.s.i.g., and preferably approximately 50 p.s.i.g., before introducing the material into a mold cavity 44 of a mold apparatus 46.

Prior to the injection of the multi-constituent gasket material into the mold appartus 46, the mold cavity 44 is preferably coated with any of a number of known mold release agents, which typically consist of low-melting point waxes or silicon oils, for example. Commercial examples of mold release agents are produced by Contour Chemical Company under the trademark KRAXO 1711, EXITT II, TRUELEASE 125, LIFFT and NONSTICKENSTOFFE, by Frekote Inc. under the trademarks FREKOTE 34, FREKOTE 34H, FREKOTE 31, and FREKOTE 31H, and by Park Chemical Company under the trademark PRC789. The volatile mold release agent is then allowed to at least partially flash off of the mold apparatu 46 which is typically at a temperature in the range of approximately 110F. to approximately 160F.

If desired, all of the mold cavity surface, or a predetermined portion thereof, may be coated with a pigmented material so that the pigmented material will be transferred in the mold to the desired surface of surfaces of the gasket assembly 18 (or other molded article) during the reaction injection molding process. An example of such pigmented material coating is manufactured by Sherwin Williams Company under the trademark POLANE. After the pigmented material coating has been allowed to flash off, the window panel 16 (glass or other transparent material) is positioned in the mold, adhesive means is applied as described below, and the mold members 48 and 50 of the mold apparatus 46 are closed, substantially in mutual engagement with one another. The constituents of the gasket material are injected into the system, mixed and introduced into the mold cavity 44 as described above, and the window panel or panels with the window gasket assembly 18 integrally molded thereon is then removed.

As is known to those skilled in the reaction injection molding art, the intermixed constituents of the molding material undergo a rapid and highly exothermic reaction in the mold cavity and approximtely 70% cured within a very short time, generally less than one to six minutes, depending upon the catalyst employed. After such time, the molded article may be removed from the molding apparatus and allowed to cool at ambient temperatures.

Figure 7:
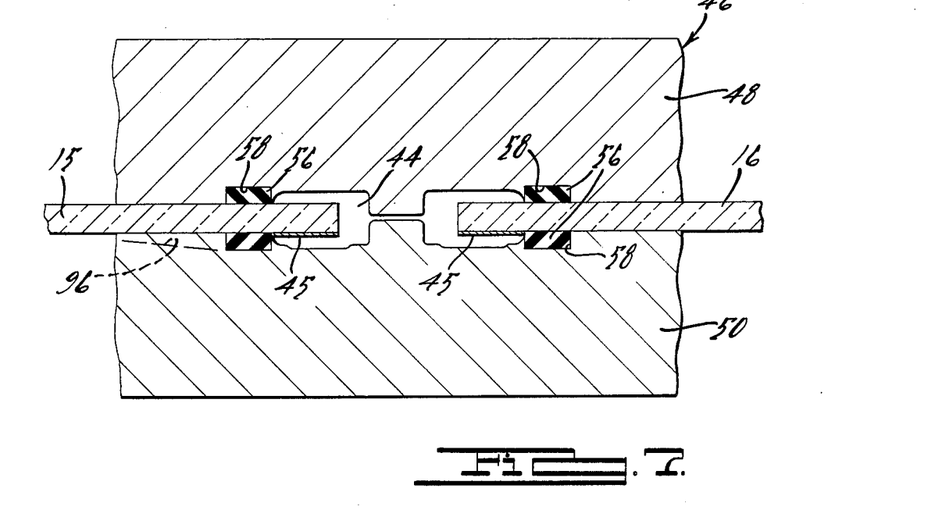
FIG. 7 is a partial cross-sectional view generally taken along line 7—7 of FIG. 6, but with the window panels in place and the mold apparatus closed.

As illustrated in FIG. 7, at least one, and preferably both, of the mold members 48 and 50 include an elongated elastomeric bead member 56 compressingly seated within a corresponding groove 58. The grooves 58 are positioned generally adjacent the peripheral of the mold cavity 44 so that the elastomeric members 56 compressingly engage and sealingly support either the opposite mold member or the window panel or panels and also substantially prevent or minimize flashing of the molding material out from the mold cavity 44. When the mold apparatus 46 is open, the elastomeric members 56 preferably protrude slightly from their associated grooves 58 so that the force required to hold the mold members 48 and 50 together in a sealing engagement is substantially reduced from the force that would be necessary if the mold members were required to be forced into direct contact with one another. Similarly, a significantly reduced pressure is exerted on the window panel or panels and consequently the frequency of breakage of the window panels is substantially minimized or eliminated. Such reduction in the force required to hold the mold members together is also significantly less than that required in conventional compression and injection molding processes. Additionally, the elastomeric members 56 are sufficiently flexible to allow for minor variations in the shape and contour of the window panel or panels and therby sealingly isolate the mold cavity 44 regardless of such minor window panel variations.

As mentioned above, window gasket assembly 18, which is preferably urethane, is securely bonded to the preferably glass window panel or panels during the molding process. Prior to the injection or other introduction of the constituents of the gasket material into the mold recesses or cavity 44, the window panel or panels, or at least the appropriate portions of their peripheral edge areas, are cleaned to remove grease, release agents, or other residue or debris. Such cleaning is preferably done with an alkaline wash. If, however, the glass window panel or panels are already relatively clean and free of release agents, a solvent wipe, of methylene chloride, for example, is applied.

Next a silane-containing material is applied, at least to the peripheral edge area portions and allowed to flash off for a period of approximately ten seconds to approximately thirty seconds. As is known to those skilled in the art, the exact time depends upon factors such as the mold temperature and the particular material used, for example. The peripheral edge area portions are then wiped to prevent the glass, or other transparent material, from clouding.

Prior to inserting the window panel or panels into the mold cavity 44, a primer material 45 is applied by wiping or spraying to at least one side of the peripheral edge area portions. A preferred example of the primer material 45 is BETASEAL glass and metal primer 435.21, as manufactured by Essex Chemical Corporation, Specialty Chemicals Division. "BETASEAL" is a registered trademark of Essex Chemical Corporation. The primer 45 is air-dried for approximately two minutes to approximately three minutes. The gasket material constituents are then injected or introduced into the mold cavity 44, which must be done within approximately 30 minutes after the primer is applied. The gasket assembly 18 is then molded as described above, and a strong adhesive and intermolecular bond is achieved.

It should be noted that although the primer 45 may alternately be applied to one or more of the opposite sides and/or edge of the peripheral edge area portions, in actually-constructed prototypes of the modular window assembly, the gasket assemblies 18 have been molded with the primer 45 on only one side of the peripheral edge area portions of the window panels and have been shown to exhibit an extremely strong and secure bond. Thus such single-sided application of the primer 45 is preferred in order to preserve materials and to minimize the handling of the window panels, thereby minimizing the potential for breakage and waste.

Figure 9:
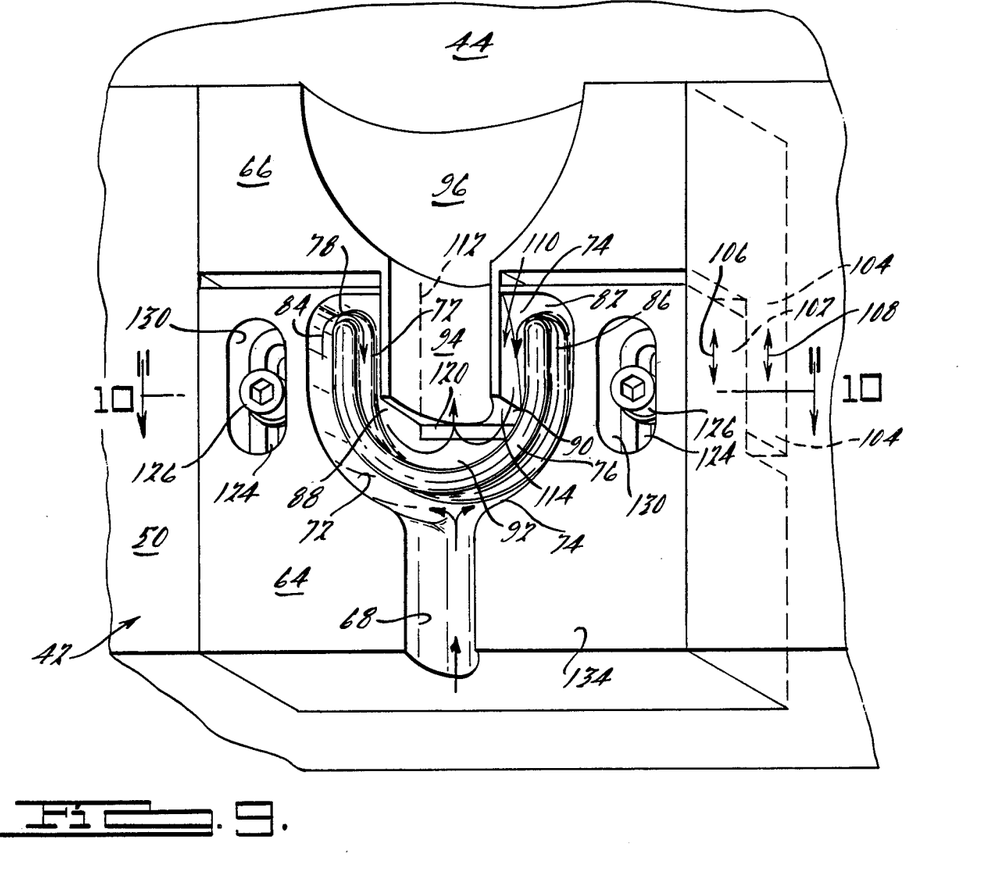
FIG. 9 is a perspective view of an aftermixer and gating apparatus for a reaction injection apparatus in accordance with the present invention.
Figure 10:
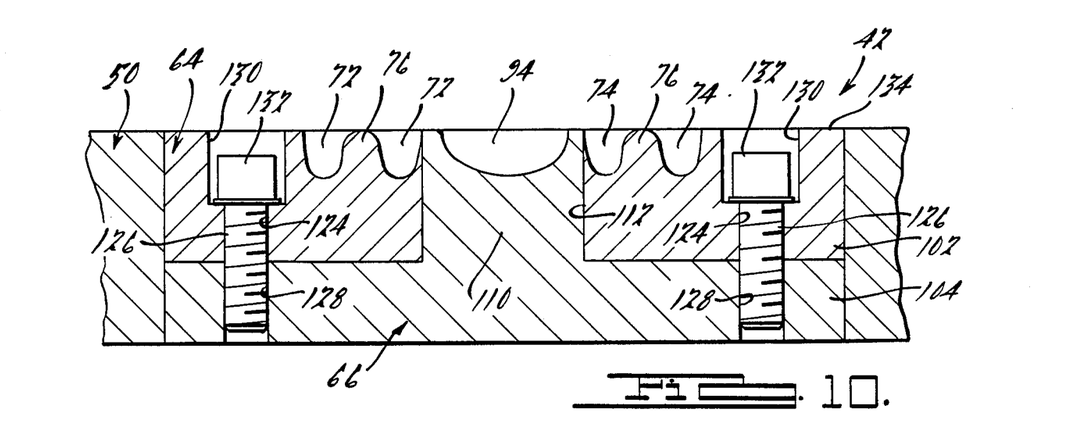
FIG. 10 is a cross-sectional view taken along line 10—10 of FIG. 9.

FIGS. 9 and 10 illustrate an improved aftermixer and gating apparatus 42, generally including an aftermixer block or body 64 and a gating block or body 66 position in one or the other of the mold members 48 or 50 for further mixing the constituents of the gasket material (preferably urethane) and admitting the material to the mold cavity 44.

The aftermixer body 64 includes at least one common inlet passageway 68 for receiving the gasket material from the high-pressure mixing apparatus 36 at a predetermined flow rate and pressure. The gasket material flows through the inlet passageway 68 into at least a pair of curvilinear mixing passageways 72 and 74 where it is separated into a corresponding number of flow streams. Such separation increases the turbulence of the gasket material flow and accordingly enhances the intermixing of its constituents. The mixing passageways 72 and 74 include a divider wall 76 therein, which form a generally serpentine path in the mixing passageways. Such serpentine path includes at least one bight porion 78 in the mixing passageway 72 and a similar bight portion 82 in the mixing passagewy 74. Such bight portions cause the gasket material to substantially reverse its direction of flow, as indicated by the flow arrows 84 and 86, respectively, in order to increase the turbulence of each of the gasket material flow streams and enhance the intermixing of the constituents therein.

Once the gasket material flows through the mixing passageways 72 and 74, it enters a corresponding number of respective inlet openings 88 and 90 of at least one common mixing cavity 92. The flow streams from the mixing passageways are reunited in the mixing cavity 92, which again reverses the flow directions of the flow streams, increases their turbulence, and enhances the intermixing of the gasket material constituents. The reunited and intermixed gasket material from the mixing cavity is received by the inlet passageway 94 in the gating body, wherein it is conveyed through a diverging fan-gate passageway 96 to the mold cavity 44.

The aftermixer body 64 preferably includes a stepped or offset portion 102 adapted to slidingly engage a preferably corresponding stepped or offset portion 104 on the gating body 66, such that the aftermixer body 64 and the gating body 66 may be slidably and adjustably moved toward or away from one another as indicated by the arrows 106 and 108. The gating body 66 also includes an integrally-formed tongue portion 110 in which the gating inlet passageway 94 is formed. The tongue portion 110 is slidably received in a slot 112 in the aftermixer body 64 for slidable and adjustable movement therein as the aftermixer and gating bodies are adjustably moved as described above. The end portion 114 of the tongue portion 110 defines the exit portion of the mixing cavity 92 such that selective movement of the tongue portion 110 in the slot 112 allows the sizes of the mixing cavity 92 and its inlet openings 88 and 90 to be selectively altered as the aftermixer and gating bodies are selectively and adjustably moved. Thus the sizes of the mixing cavity and its inlet openings may be selectively and adjustably increased as the aftermixer and gating bodies are moved apart from one another, and correspondingly such sizes may be selectively and adjustably decreased as the aftermixer and gating bodies are moved toward one another. In order to fill the unoccupied gap in the slot 112 in the aftermixer body 64 after the aftermixer body has been adjustably moved away from the gating body 66, one or more shim members 120 are removably insertable into the slot adjacent the end portion 114 of the tongue 110.

The aftermixer body is preferably provided with one or more elongated openings 124 therethrough for receiving a threaded fastener 126 extending therethrough. The threaded fastener is adapted to threadably engage a threaded aperture 128 in the gating body 66 and serves as a locking means for fixing a preselected position of the tongue portion 110 in the slot 112. Preferably, the aftermixer body 64 is also provided with countersunk portions 130 for allowing the head portions 132 of the fasteners 126 in a recessed relationship with the surface 134 of the aftermixer body 64.

The above-described selective adjustments to the size of the mixing cavity 92 and its inlet openings 94 and 96 allow for the selective alteration of the back-pressure exerted by the aftermixer and gating apparatus 42 on the gasket material flowing therethrough. Such alteration thereby allows for the selective optimization of the intermixing of the constituents of the gasket material for a predetermined flow rate and pressure of the material from the high-pressure mixing apparatus 36 shown schematically in FIG. 8. By such adjustments, therefore, the user of the reaction injection molding system may "fine-tune" the process to achieve optimum intermixing and reaction of the constituents of the molding material as well as achieving greater control over the pressure at which the molding material is introduced into the mold cavity.

The foregoing discussion discloses and describes exemplary embodiments of the present invention. One skilled in the art will readily recognize from such discussion that various changes, modifications and variations may be made therein without departing from the spirit and scope of the invention as defined in the following claims.

We claim:

1. In a window assembly having at least one substantially transparent window panel and a window gasket assembly for sealing between said transparent window panel and a window opening in a vehicle body panel or the like, the improvement wherein said gasket assembly includes a fixed gasket member adapted to be bonded and secured directly to a peripheral area of said body panel surrounding said window opening with an adhesive material without the use of a mechanical fastener device, a movable gasket member secured to at least a portion of the peripheral edge area of said window panel, said fixed and movable gasket members being interconnected by a flexible hinge web extending therebetween, said window panel and said movable gasket member being hingedly and pivotally movable relative to said fixed gasket member and said body panel, said fixed and movable gasket members and said hinge web being integrally molded in a one-piece structure, said movable gasket member being integrally molded onto at least said portion of said peripheral edge area of the window panel and bonded thereto, and said one-piece structure being reaction injection molded from a multi-constituent urethane material.

2. The invention according to claim 1, wherein said movable gasket member is integrally molded substantially continuously around substantially the entire peripheral edge area of the window panel and bonded thereto.

3. In a window assembly having at least one substantially transparent movable window panel, at least one substantially transparent fixed window panel, and a window gasket assembly for sealing between said window panels and a window opening in a vehicle body panel or the like, the improvement wherein said gasket assembly includes a fixed gasket member adapted to be bonded and secured directly to a pheripheral area of said body panel surrounding said window opening with an adhesive material without the use of a mechanical fastener device, said fixed gasket member being secured to at least a portion of the peripheral edge area of said fixed window panel, a movable gasket member secured to at least a portion of the peripheral edge area of said movable window panel, said fixed and movable gasket members being interconnected by a flexible hinge web extending therebetween, said movable window panel and gasket member being hingedly and pivotally movable relative to said fixed window panel and gasket member and said body panel, at least said fixed and movable gasket members and said hinge web being integrally molded in a one-piece structure, said fixed gasket member being integrally molded onto at least said portion of said peripheral edge area of the fixed window panel and bonded thereto, said movable gasket member being integrally molded onto at least said portion of said peripheral edge area of the movable gasket member and bonded thereto, and said one-piece structure is reaction injection molded from a multi-constituent urethane material, said fixed gasket member including an opening extending therethrough between said fixed window panel and said body panel in order to allow direct adhesive bonding between said body panel and said fixed window panel.

4. The invention according to claim 3, wherein said fixed gasket member is integrally molded substantially continuously around substantially the entire peripheral edge area of the fixed window panel and bonded thereto, said movable gasket member being integrally molded substantially continuously around substantially the entire peripheral edge area of the movable window panel and bonded thereto.

5. The invention according to claim 4, wherein said fixed gasket member and window panel are bonded and secured to said body panel substantially continuously around said peripheral area surrounding said window opening in order to substantially distribute the bonding and securing forces throughout said peripheral area surrounding said window opening.

6. A reaction injection molded window gasket assembly for a window assembly having at least two substantially transparent window panels, one of said window panels being fixed and one of said window panels being pivotally movable relative to said fixed window panel, said gasket assembly comprising a fixed gasket member integrally molded onto at least a portion of a peripheral edge area of said fixed window panel, the fixed gasket member and window panel assembly being adapted to be bonded and secured directly to a peripheral area surrounding a window opening in a vehicle body panel or the like with an adhesive material without the use of mechanical fastener devices, a movable gasket member integrally molded onto at least a portion of a peripheral edge area of said movable window panel, a flexible living hinge member interconnectably extending between said fixed and movable gasket members and being integrally formed in a one-piece structure therewith, said gasket assembly being reaction injection molded from a multi-constituent urethane material.

7. A window gasket assembly according to claim 6, wherein at least one of said gasket members has a pigmented material on at least a portion of its external surface, said pigmented material being transferred to said at least one gasket member during the reaction injection molding thereof.

8. A window gasket assembly according to claim 6, wherein said fixed gasket member and window panel assembly are adapted to be bonded and secured to said body panel substantially continuously around said peripheral area surrounding said window opening in order to substantially distribute the bonding and securing forces throughout said peripheral area.

9. In a window assembly having at least one substantially transparent movable window panel and a window gasket assembly for sealing between said window panels and a window opening in a vehicle body panel or the like, the improvement wherein said gasket assembly includes a first gasket member, a second gasket member secured to at least a portion of the peripheral edge area of said movable window panel, said first and second gasket members being interconnected by a flexible hinge web extending therebetween, said movable window panel and said second gasket member being hingedly and pivotally movable relative to said first gasket member and said body panel at least said first and second gasket members and said hinge web being integrally molded in a one-piece structure, said second gasket member being integrally molded onto at least said portion of said peripheral edge area of the movable gasket member and bonded thereto, and said one-piece structure being reaction injection molded from a multi-constituent urethane material.

10. In a window assembly having at least a pair of substantially transparent window panels and a window gasket assembly for sealing between said transparent window panel and a window opening in a vehicle body or the like, the improvement wherein said gasket assembly includes a gasket member adapted to be bonded and secured directly to a peripheral area of said portion of body surrounding said window opening with an adhesive material without the use of a mechanical fastener device, said gasket members also being secured to at least a portion of the peripheral edge areas of said window panels, said gasket members being interconnected by a flexible hinge web extending therebetween, said window panels and said movable gasket members being hingedly and pivotally movable relative to one another, said gasket members and said hinge web being integrally molded in a one-piece structure, said gasket members being integrally molded onto at least said portion of said peripheral edge areas of their respective window panels and bonded thereto, and said one-piece structure being reaction injection molded from a multi-constituent urethane material.

11. The invention according to claim 10, wherein said movable gasket member is integrally molded substantially continuously around substantially the entire peripheral edge areas of their respective window panels and bonded thereto.

* * * * *

UNITED STATES PATENT AND TRADEMARK OFFICE
CERTIFICATE OF CORRECTION

PATENT NO. : 4,761,916

DATED : August 9, 1988

INVENTOR(S) : Sanok, et al

It is certified that error appears in the above-identified patent and that said Letters Patent is hereby corrected as shown below:

Column 1, line 45, after "therein" insert --as--.

Column 2, line 2, after "movable" insert --gasket--.

Column 3, lines 2-3, delete "flow" and insert --into--.

Column 3, line 60, after "injection" insert --molding--.

Column 3, line 68, after "the" (second occurrence) insert --reaction--.

Column 4, line 24, "elimated" should be --eliminated--.

Column 4, line 53, "or" (first occurrence) should be --of--.

Column 5, line 27, after "window" insert --assembly--.

Column 5, line 56, after "modular" insert --vehicular--.

Column 5, line 60, after "a" insert --window--.

Column 6, line 10, after "bond" insert --urethane--.

Column 6, line 42, "300" should be --3000--.

Column 6, line 63, "apparatu" should be --apparatus--.

Column 7, line 1, "of" should be --or--.

Column 7, line 20, after "and" insert --are--.

Column 7, line 30, after "peripheral" insert --edges--.

Column 7, line 53, "therby" should be --thereby--.

UNITED STATES PATENT AND TRADEMARK OFFICE
CERTIFICATE OF CORRECTION

PATENT NO. : 4,761,916

DATED : August 9, 1988

INVENTOR(S) : Sanok, et al

It is certified that error appears in the above-identified patent and that said Letters Patent is hereby corrected as shown below:

Column 8, line 56, "porion" should be --portion--.

Column 8, line 58, "passagewy" should be --passageway--.

Column 9, line 38, after "body" insert --64--.

Column 10, line 40, claim 3, "pheripheral" should be --peripheral--.

Signed and Sealed this

Third Day of January, 1989

*Attest:*

DONALD J. QUIGG

*Attesting Officer*    *Commissioner of Patents and Trademarks*